US010208609B2

(12) United States Patent
Kalra et al.

(10) Patent No.: US 10,208,609 B2
(45) Date of Patent: Feb. 19, 2019

(54) TURBINE AND METHODS OF ASSEMBLING THE SAME

(71) Applicant: General Electric Company, Schenectady, NY (US)

(72) Inventors: Chiranjeev Singh Kalra, Niskayuna, NY (US); Azam Mihir Thatte, Arlington, MA (US); Douglas Carl Hofer, Clifton Park, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 513 days.

(21) Appl. No.: 14/299,280

(22) Filed: Jun. 9, 2014

(65) Prior Publication Data

US 2015/0354383 A1    Dec. 10, 2015

(51) Int. Cl.
*F01D 11/04* (2006.01)
*F01D 11/00* (2006.01)
(Continued)

(52) U.S. Cl.
CPC ............ *F01D 11/003* (2013.01); *B23P 15/04* (2013.01); *F01D 1/02* (2013.01); *F01D 11/04* (2013.01);
(Continued)

(58) Field of Classification Search
CPC ...... F01D 11/00; F01D 11/001; F01D 11/003; F01D 11/02; F01D 11/04; F01D 11/06;
(Continued)

(56) References Cited

U.S. PATENT DOCUMENTS

| 2,623,357 A | 12/1952 | Birmann |
| 3,056,580 A | 10/1962 | Swank et al. |

(Continued)

FOREIGN PATENT DOCUMENTS

| CA | 2890484 A1 | 3/2014 | |
| DE | 102009004881 A1 * | 7/2010 | ............. B22F 3/225 |

(Continued)

OTHER PUBLICATIONS

DE 102009004881 A1 (Jul. 2010)—English Translation.*

(Continued)

*Primary Examiner* — Justin Seabe
(74) *Attorney, Agent, or Firm* — GE Global Patent Operation; Marc A. Vivenzio

(57) ABSTRACT

A turbine operable with a first fluid and a second fluid is provided. The turbine includes a shaft and having a dry gas seal area, a balance area, and a shaft surface. The turbine also includes a stationary component coupled to a housing and having a first side and a second side and defining a channel in flow communication with the shaft surface. A heat exchange assembly is coupled to the housing and in flow communication with the shaft and the stationary component. The heat exchange assembly includes a first flow path coupled in flow communication with the dry gas seal area and the channel and configured to direct the first fluid along the first side. Heat exchange assembly also includes a second flow path coupled in flow communication with the balance area and channel and configured to direct the second fluid along the second side.

20 Claims, 8 Drawing Sheets

(51) Int. Cl.
  *B23P 15/04* (2006.01)
  *F01D 25/12* (2006.01)
  *F01D 1/02* (2006.01)
  *F01D 11/06* (2006.01)
  *F02C 6/18* (2006.01)

(52) U.S. Cl.
  CPC ............. *F01D 11/06* (2013.01); *F01D 25/12* (2013.01); *F02C 6/18* (2013.01); *F05D 2240/55* (2013.01); *F05D 2260/20* (2013.01); *Y10T 29/49323* (2015.01)

(58) Field of Classification Search
  CPC ..... F01D 1/00; F01D 1/02; F01D 1/04; F01D 25/12
  See application file for complete search history.

(56) References Cited

U.S. PATENT DOCUMENTS

| | | |
|---|---|---|
| 3,291,447 A | 12/1966 | Brandon |
| 4,141,672 A | 2/1979 | Wieland et al. |
| 4,451,200 A * | 5/1984 | Libertini ................ F01D 25/18 |
| | | 384/398 |
| 4,537,032 A | 8/1985 | Kaplan |
| 4,544,167 A * | 10/1985 | Giroux ................... F01D 11/02 |
| | | 277/382 |
| 4,792,278 A | 12/1988 | Emerson |
| 4,871,295 A | 10/1989 | Kaplan |
| 5,564,896 A | 10/1996 | Beeck et al. |
| 6,048,169 A | 4/2000 | Feldmuller et al. |
| 6,102,654 A | 8/2000 | Oeynhausen et al. |
| 6,655,153 B2 | 12/2003 | Akiyama et al. |
| 6,860,110 B2 | 3/2005 | Akiyama et al. |
| 7,694,522 B2 | 4/2010 | Nakae et al. |
| 8,262,349 B2 * | 9/2012 | Turnquist .............. F01D 11/025 |
| | | 277/412 |
| 2007/0006566 A1 | 1/2007 | Dean et al. |
| 2010/0254811 A1 | 10/2010 | Kuzdzal et al. |
| 2011/0308231 A1 | 12/2011 | Carpenter et al. |
| 2013/0097994 A1 | 4/2013 | Wang |
| 2013/0280028 A1 | 10/2013 | Benjamin et al. |
| 2013/0294883 A1 | 11/2013 | Ballard, Jr. et al. |
| 2014/0190172 A1 | 7/2014 | Maier |
| 2014/0230401 A1 * | 8/2014 | Dunn ....................... F02C 3/34 |
| | | 60/39.52 |
| 2015/0354361 A1 | 12/2015 | Hofer et al. |
| 2015/0354374 A1 | 12/2015 | Hofer et al. |

FOREIGN PATENT DOCUMENTS

| | | |
|---|---|---|
| JP | 5338853 A | 4/1978 |
| WO | 2013025341 A1 | 2/2013 |
| WO | 2013056437 A1 | 4/2013 |

OTHER PUBLICATIONS

Camporeale et al.,"Dynamic Modelling of Recuperative Gas Turbines", Proceedings of the Institution of Mechanical Engineers, Part A: Journal of Power and Energy, Sage journals, pp. 213-225, vol. No. 214 Issue No. 3, May 1, 2000.

PCT Search Report and Written Opinion issued in connection with corresponding Application No. PCT/US2015/030707 dated Oct. 23, 2015.

Badr et al., "Multi-vane Expanders as Prime Movers for Low-grade Energy Organic Rankine-cycle engines", Applied Energy, ScienceDirect, vol. No. 16, Issue No. 2, pp. 129-146, 1984.

Angelino et al., "Multicomponent Working Fluids for Organic Rankine Cycles (ORCs)", Energy, ScienceDirect, vol. No. 23, Issue No. 6. pp. 449-463, Jun. 1998.

* cited by examiner

TURBINE AND METHODS OF ASSEMBLING THE SAME

STATEMENT REGARDING FEDERALLY SPONSORED RESEARCH & DEVELOPMENT

This invention was made with Government support under Contract No. DE-EE0005804 awarded by the Department of Energy. The Government has certain rights in this invention.

BACKGROUND

The embodiments described herein relate generally to turbines, and more particularly, to methods and systems for thermal management of a turbine shaft.

Recently, the use of high power density working fluids, such as supercritical carbon dioxide ($CO_2$) and ultrahigh pressure steam, is being explored as a potential working fluid for use with axial flow turbine engines. The use of high power density working fluids generally enables axial flow turbine engines to operate at increased rotational speeds. As such, smaller turbine engines utilizing high power density working fluids can produce similar power outputs relative to comparatively larger turbine engines utilizing conventional working fluids or at lower operating pressures. However, operating turbine engines with high power density working fluid and at increased rotational speed may present challenges relating to torque transmission, loading, inefficient thermal gradients, seal degradation, and efficiency losses of traditional mechanisms that couple turbine stages to rotor shafts.

Supercritical $CO_2$ may have high operating temperatures and high heat transfer coefficients which may result in a high Biot number. The Biot number is an index of the ratio of the heat transfer resistances within and at the surface of a heated component such as, for example, a turbine shaft and a turbine stator. The ratio can determine whether or not the temperatures within the heated component will vary significantly while the component heats or cools over time with respect to a thermal gradient of the heated component. Typically, thermal gradients with small Biot numbers such as, for example, numbers less than one are thermally manageable. Biot numbers larger than one, however, may indicate thermal gradient problems due to non-uniformity of temperature fields created within the heated component.

Supercritical $CO_2$, as a working fluid in a turbine, may result in a Biot number larger than one which may create excessive thermal gradients in the turbine shaft and/or stationary components of the turbine. Large thermal gradients may induce excessive axial and/or hoop stresses in turbine components which may lead to reduced component life, inefficient turbine operations, and increased operating, maintenance, and/or replacement costs for the turbine. Moreover, the high operating temperatures of supercritical $CO_2$ may exceed temperature limits of dry gas seals present with the turbine. Consequently, supercritical $CO_2$ may over heat the dry gas seals which may lead to efficiency losses and/or damaged turbine components.

BRIEF DESCRIPTION

In one aspect, a turbine operable with a first fluid and a second fluid is provided. The turbine includes a housing and a rotatable shaft supported within the housing and having a dry gas seal area, a balance area, and a shaft surface extending between the dry gas seal area and the balance area. The turbine also includes a stationary component coupled to the housing and having a first side and a second side and defining a channel in flow communication with the shaft surface. The turbine further includes a seal assembly coupled to the shaft surface and extending into the channel. A heat exchange assembly is coupled to the housing and in flow communication with the rotatable shaft and the stationary component. The heat exchange assembly includes a first flow path coupled in flow communication with the dry gas seal area and the channel, and is configured to direct the first fluid along the first side at a first pressure. The heat exchange assembly also includes a second flow path coupled in flow communication with the balance area and the channel, and is configured to direct the second fluid along the second side at a second pressure substantially similar to the first pressure.

In another aspect, a power generation system is also provided. The power generation system includes a waste heat recovery unit configured to heat a supercritical working fluid having a Biot number of at least one. A turbine is coupled in flow communication with the waste heat recovery unit. The turbine includes a housing and a rotatable shaft supported within the housing. A stator is coupled to the housing and has a first side and a second side and defines a channel in flow communication with the rotatable shaft. The power generation system also includes a heat exchange assembly coupled to the turbine and in flow communication with the rotatable shaft and the stator. The heat exchange assembly is configured to direct a fluid along the first side at a first pressure and to direct the supercritical fluid along the second side at a second pressure substantially similar to the first pressure.

In yet another aspect, a method of assembling a turbine within a housing is provided. The method includes coupling a rotatable shaft to the housing, the rotatable shaft having a dry gas seal area, a balance area, and a shaft surface extending between the dry gas seal area and the balance area. The method also includes coupling a stationary component to the housing and having a first side and a second side. The stationary component defines a channel in flow communication with the shaft surface. The method further includes coupling a seal assembly to the rotatable shaft and extending into the channel. The method includes coupling a heat exchange assembly in flow communication with the rotatable shaft and the stationary component. In the exemplary method, the heat exchange assembly includes a first flow path coupled in flow communication with the dry gas seal area and the channel, and is configured to direct a first fluid along the first side. Moreover, the heat exchange assembly includes a second flow path coupled in flow communication with the balance area and the channel, and is configured to direct a second fluid along the second side.

DRAWINGS

These and other features, aspects, and advantages will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The embodiments described herein relate to power generation system and methods of thermal management of heated components of a turbine of the power generation system. The embodiments also relate to methods, systems and/or apparatus for controlling thermal gradients of turbine components and controlling working fluids present within turbines. The embodiments describe systems and methods of safely managing characteristics of supercritical working fluids such as carbon dioxide. The embodiments also describe systems and methods to recover supercritical working fluids from other systems for reuse in turbines. The embodiments described herein include a variety of types of rotational assemblies, and the descriptions and figures that utilize turbines and supercritical carbon dioxide gas are exemplary only. The exemplary power generation system manages thermal gradients in rotational shafts and the stationary components of the turbine to reduce stresses within the rotational shafts and stationary components to increase efficiency and operating life of the turbine. The power generation system further reduces overheating of turbine seals.

Figure 1:
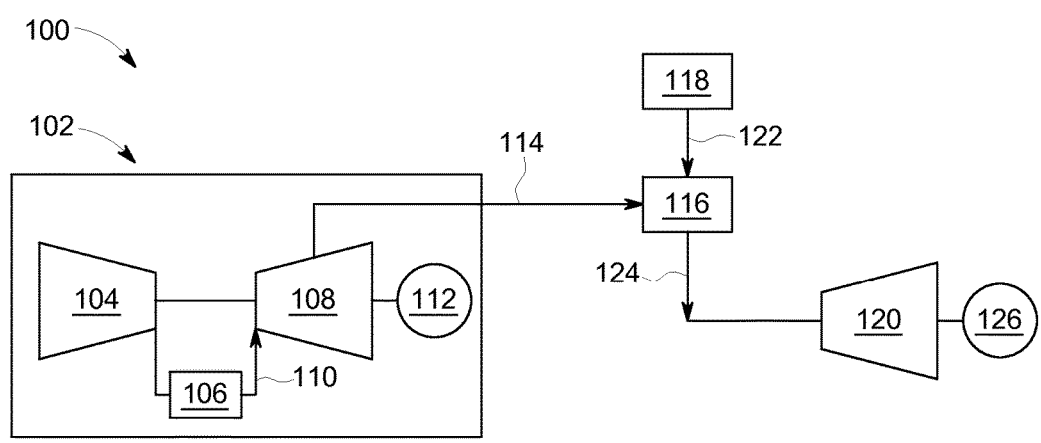
FIG. 1 is a schematic illustration of an exemplary power generation system.

FIG. 1 is a schematic illustration of an exemplary power generation system 100. Power generation system 100 includes a gas turbine engine assembly 102 that includes a compressor 104, a combustor 106, and a first turbine 108 powered by expanding a flow of hot gas 110 produced in combustor 106 for driving a first electrical generator 112. A flow of exhaust gas 114 is channeled from first turbine 108 towards a waste heat recovery unit (WHRU) 116 that recovers waste heat from exhaust gas 112. Power generation system 100 also includes a working fluid source 118 coupled in flow communication with WHRU 116, and a second turbine 120 coupled downstream from WHRU 116. A flow of working fluid 122 is channeled towards WHRU 116 and, in one embodiment, waste heat from exhaust gas 114 facilitates heating working fluid 122 to a supercritical state. Alternatively, working fluid 122 channeled towards WHRU 116 is in a supercritical state prior to entering WHRU 116. A flow of supercritical working fluid 124 is then channeled towards second turbine 120, which is powered by expanding the flow of supercritical working fluid 124 for driving a second electrical generator 126.

Working fluid 122 is any working fluid that enables power generation system 100 to function as described herein. Exemplary working fluids include, but are not limited to, carbon dioxide and steam. In an alternative embodiment, working fluid 122 may be heated by any heat source that enables power generation system 100 to function as described herein and may be in a non-supercritical state. For example, working fluid 122 may be heated by nuclear energy or concentrated solar energy.

Figure 2:
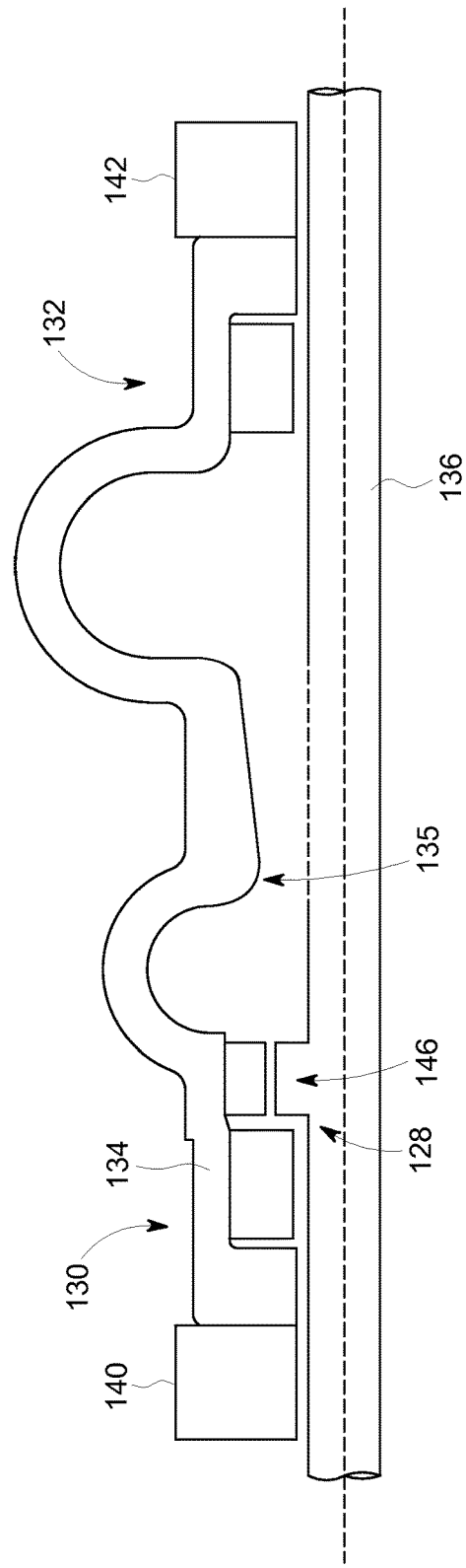
FIG. 2 is a cross sectional view of a turbine that may be used with the power generation system shown in FIG. 1.
Figure 3:
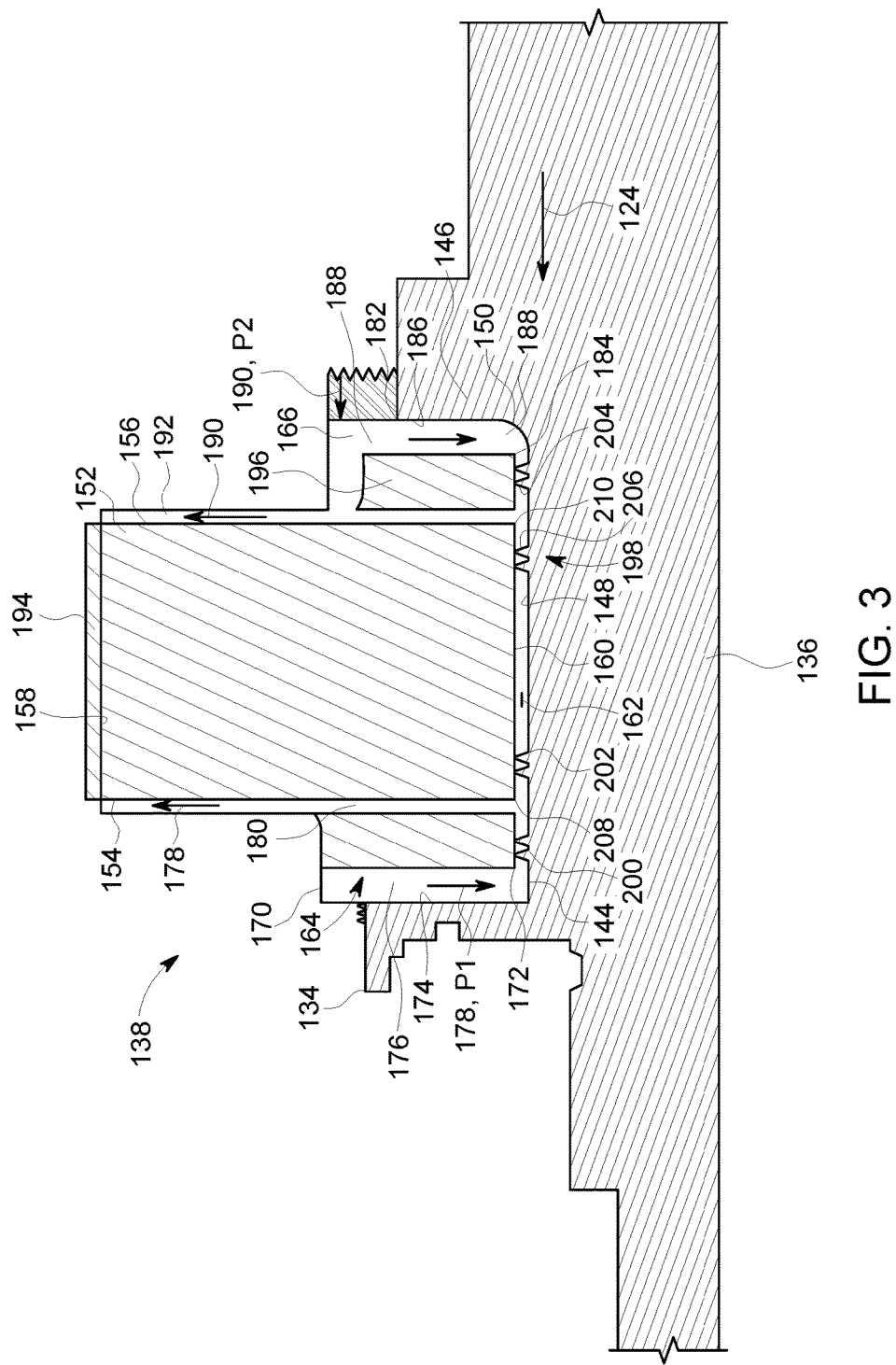
FIG. 3 is partial cross sectional view of an exemplary heat exchange assembly of the turbine shown in FIG. 2.

FIG. 2 is a cross-sectional view of turbine 120 of power generation system 100. FIG. 3 is a partial cross-sectional view of a heat exchange assembly 128 of turbine 120. In the exemplary embodiment, turbine 120 includes an entry end 130, an exit end 132, a housing 134, and a rotatable shaft 136 supported within housing 134 and extending between entry end 130 and exit end 132. An expansion stage 135 such as, but not limited to, an axial stage, a radial stage, and a multi-stage radial stage extends between entry end 130 and exit end 132. Moreover, turbine 120 includes an end seal area 138 such as, but not limited to, a dry gas seal coupled to entry end 130. End seal areas 138 includes seals such as, but not limited to, dry gas seals, labyrinth seals, brushless seals, bearing oil seals, and honeycomb seals. Dry gas seal 138 is configured to receive hydrodynamic force feedback from the rotor and adjust the position of a compliant member (not shown) so as not to rub during event of a thermal/centrifugal growth of the heated component. Moreover, dry gas seal 138 is configured to maintain at least an order of magnitude of lower leakage as compared to other seal types to facilitate preventing efficiency losses associated with leakage. Dry gas seal 138 can include any type of seal to enable turbine 120 to function as described herein. Entry end 130 includes a bearing 140 configured to support shaft 136. Moreover, exit end 132 includes another bearing 142 configured to support shaft 136.

Shaft 136 includes a dry gas seal area 144, a balance area 146, and a shaft surface 148 extending between dry gas seal area 144 and balance area 146. Dry gas seal area 144 is positioned within dry gas seal 138 and configured to isolate shaft 136 from atmospheric conditions present outside of housing 134. Balance area 146 is configured to rotationally balance shaft 136 during turbine operations. Shaft 136 further includes a fillet region 150 located between shaft surface 148 and balance area 146. In the exemplary embodiment, shaft 136 includes a thermal conductivity that is less than the heat transfer coefficient of supercritical working fluid 124 on component surfaces. A stationary component 152 such as, but not limited to, a stator is coupled to housing 134. Alternatively, stationary component 152 is not limited to a stator and can include any heated component within turbine 120. Stationary component 152 includes a first side 154, a second side 156, an end wall 158, and another end wall 160. In the exemplary embodiment, end wall 160 is spaced away from shaft surface 148 and defines a channel 162 in flow communication with shaft surface 148.

In the exemplary embodiment, heat exchange assembly 128 is coupled to rotor housing 134 and in flow communication with shaft 136 and stationary component 152. Heat exchange assembly 128 includes a first flow path 164, a second flow path 166, and a seal assembly 168. More particularly, first flow path 164 is coupled in flow communication with dry gas seal area 144 and to channel 162. First flow path 164 includes an inlet 170, an outlet 172, and inner sidewalls 174 extending there between. Inner sidewalls 174 define a channel 176 from inlet 170 and to outlet 172. Channel 176 includes a configuration such as, but not limited to, a pipe, a conduit, and a vane. Alternatively, channel 176 can include any configuration to enable first flow path 164 to function as described herein.

In the exemplary embodiment, inlet 170 is coupled in flow communication with a cooling fluid source (not shown) such as, but not limited to, a compressor exit and a pump exit. Cooling fluid source provides a first fluid 178 to inlet 170 and channel 176 is configured to direct first fluid 178 from inlet 170 and toward outlet 172. Outlet 172 is coupled in flow communication with channel 162 is and configured to discharge first fluid 178 toward channel 162. In the exemplary embodiment, first fluid 178 has a pressure range from about 3,000,000 Pascal (Pa) to about 18,000,000 Pa and a temperature range for about 30° Celsius (C) to about 200° C. and a heat transfer coefficient range from about 0.5 $KW/m^2K$ to about 10 $KW/m^2K$. More particularly, first fluid 178 includes, for example only, carbon dioxide having a first pressure P1 of about 8,000,000 Pa and a temperature of about 100° C. and a heat transfer coefficient of about 2.5 $KW/m^2K$. First fluid 178 can include any pressure, temperature and heat transfer coefficient to enable heat exchange assembly 128 to function as described herein. First fluid 178 is configured to flow from cooling source (not shown), along or across dry gas seal area 144 to facilitate cooling shaft 136.

First flow path 164 further includes a first vent 180 coupled in flow communication with outlet 172 and first side 154. First vent 180 is configured to receive first fluid 178 from outlet 172 and direct first fluid 178 along first side 154. First side 154 is configured to transfer heat from stationary component 152 and into first fluid 178 flowing through first vent 180 to facilitate cooling stationary component 152.

Second flow path 166 is coupled in flow communication with balance area 146 and channel 162. Alternatively, second flow path 166 can be coupled in flow communication with an inlet plenum area (not shown). Second flow path 166 includes an inlet 182, an outlet 184, and inner sidewalls 186 extending there between. Inner sidewalls 186 define a channel 188 extending between inlet 182 and outlet 184. Channel 188 includes a configuration such as, but not limited to, a pipe, a conduit, and a vane. Alternatively, channel 188 can include any configuration to enable second flow path 166 to function as described herein.

Inlet 182 is coupled in flow communication with a hot fluid source such as, for example only, leakage flow from supercritical working fluid 124. More particularly, hot fluid source such as, for example only, WHRU 116 provides a second fluid 190 such as, but not limited to, supercritical fluid 124 to inlet 182. Channel 188 is configured to direct second fluid 190 from inlet 182 and toward outlet 184. Outlet 184 is coupled in flow communication with channel 162 and is configured to discharge second fluid 190 toward channel 162. Alternatively, a primary heater (not shown) such as, but not limited to, a nuclear heater, a solar heater, a natural gas heater, and a coal fired heater may provide second fluid 190 to second flow path 166. In the exemplary embodiment, second fluid 190 has a pressure range from about 3,000,000 Pa to about 18,000,000 Pa, a temperature range from about 350° C. to about 850° C., and a heat transfer coefficient range from about 2.5 $KW/m^2K$ to about 35 $KW/m^2K$. More particularly, second fluid 190 includes supercritical carbon dioxide having a second pressure P2 of about 8,000,000 Pa, a temperature of about 715° C., and a heat transfer coefficient of about 33 $KW/m^2K$. Moreover, second fluid 190 has a Biot number of at least 1. More particularly, second fluid 190 has a Biot number having a range from about 5 to about 50. Alternatively, second fluid 190 can include any Biot number operable with power generation system. Second fluid 190 is configured to flow along or around balance area 146 to facilitate cooling balance area 146.

Second flow path 166 further includes a second vent 192 coupled in flow communication with outlet 184 and second side 156. Second vent 192 is configured to receive second fluid 190 from outlet 184 and direct second fluid 190 along second side 156. Second side 156 is configured to transfer heat from stationary component 152 and into second fluid 190 flowing through second vent 192 to facilitate cooling stationary component 152.

In the exemplary embodiment, heat exchange assembly 128 includes an insulator 194 coupled to end wall 158. Insulator 194 is configured to reduce heat transfer from stationary component 152 and through end wall 158. Alternatively, insulator 194 is configured to substantially eliminate heat transfer from stationary component 152 and through end wall 158. Moreover, heat exchange assembly 128 includes a baffle 196 coupled to housing 134 and positioned within second flow path 166. Baffle 196 is configured to receive flow of second fluid 190 to facilitate reducing pumping effects of flow of second fluid 190 and into second flow path 166. Alternatively, baffle 196 is configured to receive flow of second fluid 190 to facilitate substantially eliminating pumping effects of flow of second fluid 190 and into second flow path 166. More particularly, baffle 196 is configured to streamline flow of second fluid 190 within second flow path 166.

Seal assembly 168 is coupled to shaft surface 148 and extends into channel 162. In the exemplary embodiment, seal assembly 168 includes a plurality of seals 198 such as, but not limited to, labyrinth seals, brush seals, and honeycomb seals. Alternatively, seals 198 may include any type of seal to enable seal assembly 168 to function as described herein. The plurality of seals 198 is selectively arranged along shaft surface 148 and within channel 162. In the exemplary embodiment, the plurality of seals 198 includes a first seal 200, a second seal 202, a third seal 204, and a fourth seal 206 which are selectively arranged along shaft surface 148. First seal 200 is coupled to shaft surface 148 and located between first flow path 164 and channel 162. Second seal 202 is coupled to shaft surface 148 and adjacent first vent 180. In the exemplary embodiment, third seal 204 is coupled to shaft surface 148 and located between second flow path 166 and channel 162. Fourth seal 206 is coupled to shaft surface 148 and adjacent to second vent 192. In the exemplary embodiment, seal assembly 168 is configured to reduce flow of first fluid 178 through channel 162 and under stationary component 152. Alternatively, seal assembly 168 is configured to substantially eliminate flow of first fluid 178 through channel 162 and under stationary component 152. Moreover, seal assembly 168 is configured to reduce flow of second fluid 190 through channel 162 and under stationary component 152. Alternatively, seal assembly 168 is configured to substantially eliminate flow of second fluid 190 through channel 162 and under stationary component 152

In the exemplary embodiment, first flow path 164, second flow path 166, and seal assembly 168 are configured to facilitate balancing first pressure P1 of first fluid 178 and second pressure P2 of second fluid 190 with respect to ends 208 and 210 of channel 162. More particularly, first flow path 164 and second flow path 166 are configured and seal assembly 168 is selectively arranged to reduce second pressure P2 to substantially the same as first pressure P1 of first fluid 178. In the exemplary embodiment, balancing fluid pressures at ends 208 and 210 of channel 162 facilitates first fluid 178 to flow from outlet 172 and within first vent 180 and second fluid 190 to flow from outlet 184 and within second vent 192. Accordingly, balancing flow pressures at ends 208 and 210 of channel 162 facilitates reducing flow of first fluid 178 within channel 162 and toward second flow path 166. Moreover, balancing flow pressures at ends 208 and 210 of channel 162 facilitates reducing flow of second fluid 190 within channel 162 and toward first flow path 164.

Directing flow of second fluid 190 through second vent 192 reduces the high temperature and Biot number of second fluid 190 being exposed to shaft surface 148 which facilitates generating uniform thermal gradients within shaft 136. Further, directing flow of second fluid 190 through second vent 192 reduces the high temperatures and Biot numbers of second fluid 190 flowing through dry gas seals 138 to facilitate reducing overheating and/or drying of dry gas seals 138.

During an exemplary operation, first flow path 164 directs first fluid 178 from cooling fluid source and into channel 176. Channel 176 directs first fluid 178 through first seal 200 and into first vent 180. While first fluid 178 flows through channel 176 and first vent 180, heat transfers from dry gas seal area 144 and into first fluid 178 to facilitate cooling dry gas seal area 144. Moreover, as first fluid 178 flows through first vent 180, heat transfers from stationary component 152, through first side 154, and into first fluid 178 to facilitate cooling stationary component 152. Insulator 194 reduces heat transfer from end wall 158 to increase heat transfer from first side 154 and into first fluid 178 flowing in first vent 180. Second seal 202 reduces first fluid 178 from flowing into and through channel 162. More particularly, second seal 202 directs first fluid 178 to flow into first vent 180. Further, first seal 200 and second seal 202 stabilize first pressure P1 of first fluid 178.

Moreover, during operation, inlet 182 of second flow path 166 directs second fluid 190 from hot fluid source and into channel 188. Channel 188 directs second fluid 190 through fourth seal 206 and into second vent 192. While second fluid 190 flows through channel 188 and second vent 192, heat transfers from balance area 146 and into second fluid 190 to facilitate cooling balance area 146. Flow of high temperature second fluid 190 reduces thermal gradients from developing within fillet region 150 which reduces thermal stresses applied to fillet region 150. Second fluid 190 impinges baffle 196 to reduce jet pumping effects present within second fluid 190. Managing the pumping effects of second fluid 190 facilitates reducing cooler first fluid 178 from being drawn under stationary component 152, through channel 162, and toward balance area 146. Moreover, as second fluid 190 flows through second vent 192, heat transfers from stationary component 152, through second side 156, and into second fluid 190 to facilitate cooling stationary component 152. Insulator 194 reduces heat transfer from end wall 158 to increase heat transfer from second side 156 and into second fluid 190 flowing in second vent 192.

Third seal 204 reduces second fluid 190 flowing into and through channel 162. More particularly, third seal 204 directs second fluid 190 to flow into second vent 192. Moreover, third seal 204 and fourth seal 206 regulate second pressure P2 of second fluid 190. More particularly, the arrangement of first seal 200, second seal 202, third seal 204, and fourth seal 206 regulates second pressure P2 as substantially the same as first pressure P1 to balance pressure at ends 208 and 210 of channel 162.

During operation, maintaining both ends 208 and 210 of channel 162 at substantially equal pressure facilitates reducing flow of either first fluid 178 or second fluid 190 through channel 162. Alternatively, during operation, maintaining both ends 208 and 210 of channel 162 at substantially equal pressure facilitates substantially eliminating flow of either first fluid 178 or second fluid 190 through channel 162. Moreover, reducing flow of first fluid 178 and second fluid 190 through channel 162 and under stationary component 152 reduces heat transfer from shaft surface 148 and into channel 162. Reducing the heat transfer from shaft surface 148 and into channel 162 facilitates generating a controlled, smooth, and axial temperature gradient to develop within shaft 136. The controlled temperature gradient within shaft 136 facilitates reducing stresses within shaft 136 to increase shaft life and turbine efficiency. Moreover, reducing eliminating flow of second fluid 190 through channel 162 facilitates maintaining second fluid 190 away from dry seals to prevent overheating of dry gas seals 138 during turbine operation.

Figure 4:
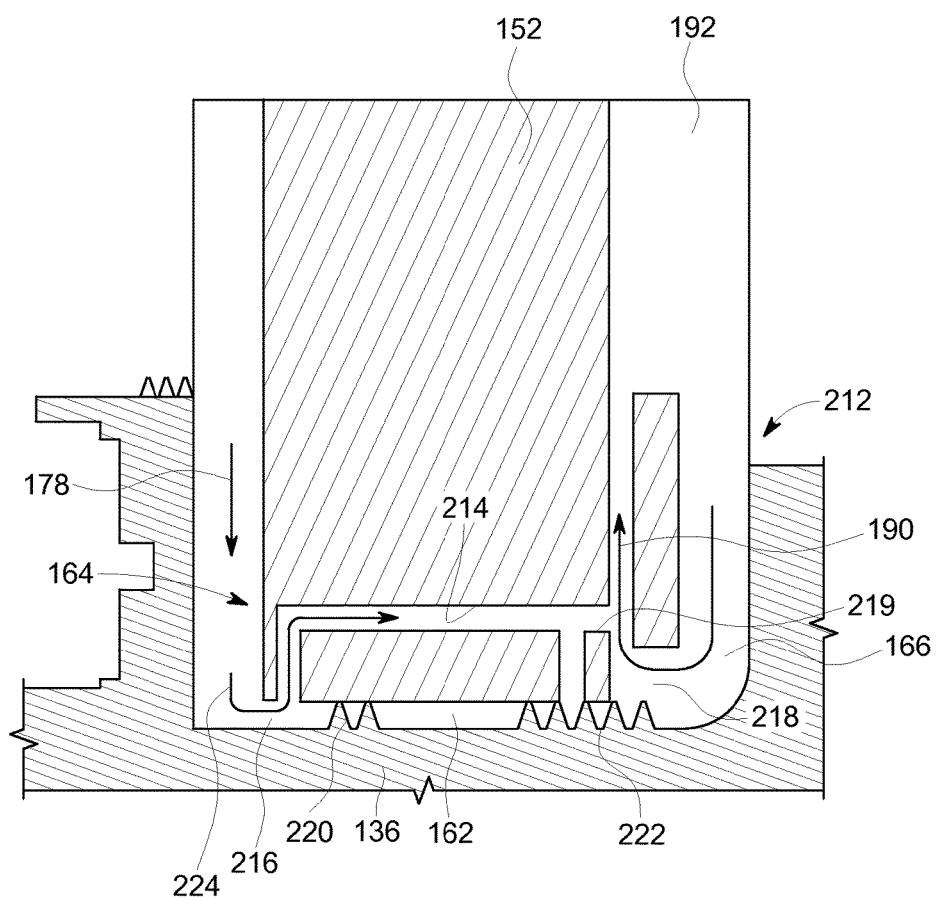
FIG. 4 is partial cross sectional view of an alternative heat exchange assembly of the turbine shown in FIG. 2.

FIG. 4 is a partial cross-sectional view of an alternative heat exchange assembly 212. In FIG. 4, similar element numbers correspond to similar components as shown in FIGS. 1-3. In the exemplary embodiment, heat exchange assembly 212 includes a cooling channel 214 disposed within stationary component 152. Cooling channel 214 includes a first inlet 216, a second inlet 218, and an outlet 219. First inlet 216 is positioned in flow communication with channel 162 and adjacent to first flow path 164. Second inlet 218 is positioned in flow communication with channel 162 and adjacent to second flow path 166. Outlet 219 is positioned in flow communication with second flow path 166. The number and arraignment of cooling channel 214 are selectively variable to facilitate uniform thermal gradients within shaft 136 and heat transfer form stationary component 152.

Seal assembly 168 includes a first seal 220 coupled to shaft surface 148 and extending into channel 162. Seal assembly 168 further includes a second seal 222 coupled to balance area 146 and extending into channel 162 and into second flow path 166. In exemplary embodiment, second seal 222 includes a greater number of seals than first seal 220. Alternatively, second seal 222 can include a lesser number of seals or the same number of seals as first seal 220.

First seal 220 is configured to reduce flow of first fluid 178 through channel 162 and into second flow path 166. Alternatively, first seal 220 is configured to substantially eliminate flow of first fluid 178 through channel 162 and into second flow path 166. Moreover, first seal 220 is configured to direct a portion 224 of first fluid 178 through cooling channel 214 to mix with second fluid 190 flowing through second flow path 166. Mixing first fluid portion 224 with second fluid 190 facilitates increasing heat transfer from stationary component 152 and into second fluid 190 flowing through second vent 192. Second seal 222 is configured to reduce flow of second fluid 190 through channel 162 and into first flow path 164. Alternatively, second seal 222 is configured to substantially eliminate flow of second fluid 190 through channel 162 and into first flow path 164. Moreover, second seal 222 is configured to direct second fluid 190 to mix with first fluid portion 224 for subsequent flow through second vent 192. First seal 220 and second seal 222 are selectively arranged and numbered to balance pressures of first fluid 178 and second fluid 190 to reduce fluid flow within channel 162 as previously discussed.

Figure 5:
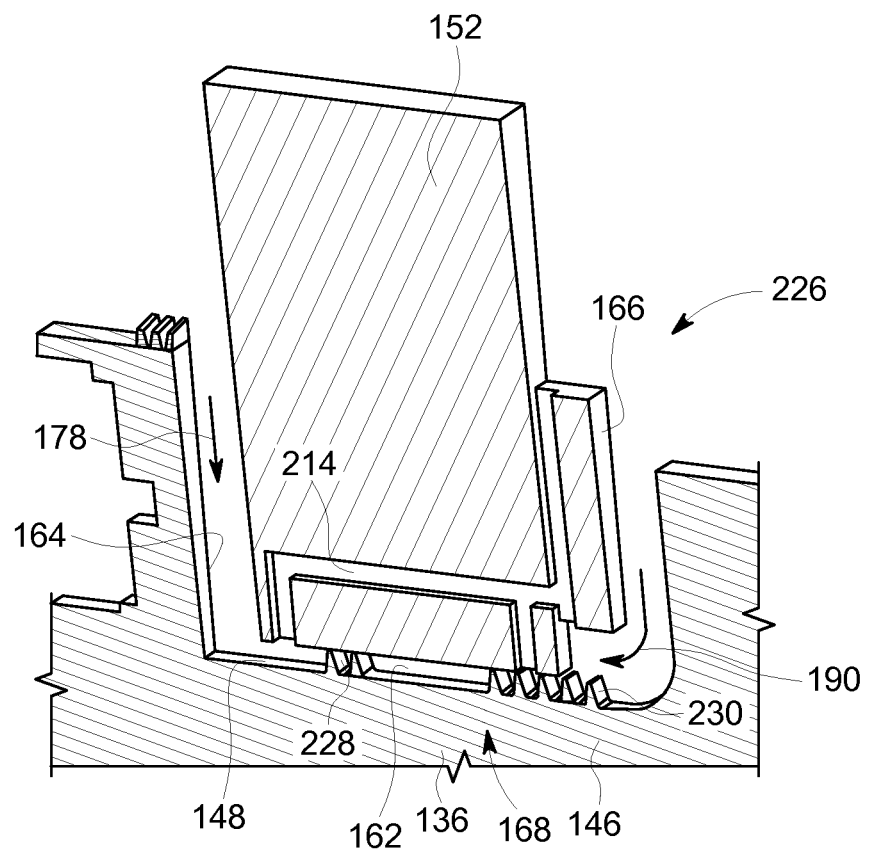
FIG. 5 is a partial cross sectional view of another alternative heat exchange assembly of the turbine shown in FIG. 2.

FIG. 5 is a partial cross-sectional view of an alternative heat exchange assembly 226. In FIG. 5, similar element numbers correspond to similar components as shown in FIGS. 1-4. In the exemplary embodiment, at least one of first flow path 164, second flow path 166, channel 162, and cooling channel 214 include a square configuration having an angle range from about 5 degrees to about 90 degrees. Seal assembly 168 includes a first seal 228 coupled to shaft surface 148 and extending into channel 162. Seal assembly 168 further includes a second seal 230 coupled to balance area 146 and extending into channel 162 and into second flow path 166. First seal 228 and second seal 230 are selectively arranged and numbered to balance pressures of first fluid 178 and second fluid 190 to reduce fluid flow within channel 162 as previously discussed. Moreover, the number and arraignment of cooling channel 214 are selectively variable to facilitate uniform thermal gradients within shaft 136 and heat transfer form stationary component 152.

Figure 6:
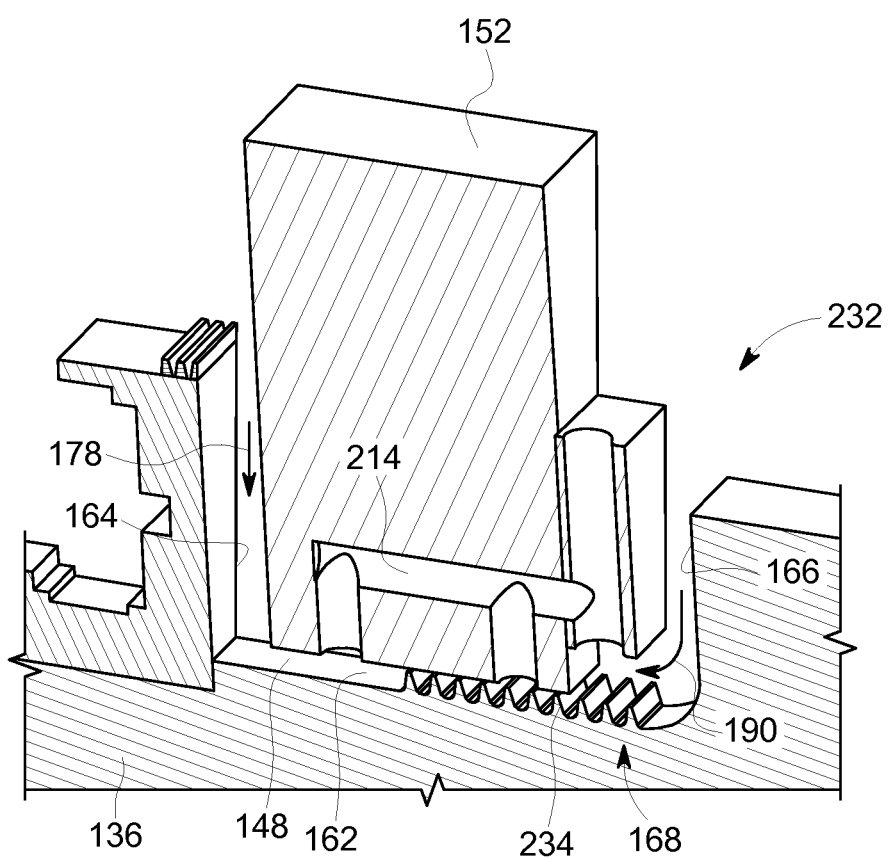
FIG. 6 is a partial cross sectional view of yet another alternative heat exchange assembly of the turbine shown in FIG. 2.

FIG. 6 is a partial cross-sectional view of another alternative heat exchange assembly 232. In FIG. 6, similar element numbers correspond to similar components as shown in FIGS. 1-5. In the exemplary embodiment, first flow path 164, second flow path 166, channel 162, and cooling channel 214 include an arcuate configuration having a range for about 5 degrees to about 30 degrees. In the exemplary embodiment, arcuate configuration includes about 15 degrees. A higher number of circumferential channels 162 and/or lower arcuate configuration results in a more uniform circumferential temperature distribution. Seal assembly 168 includes a plurality of seals 234 coupled to shaft surface 148 and extending into channel 162 and second flow path 166. Seals 234 are selectively arranged and numbered to balance pressures of first fluid 178 and second fluid 190 to reduce fluid flow within channel 162 as previously described. Moreover, the number and arraignment of cooling channel 214 are selectively variable to facilitate uniform thermal gradients within shaft 136 and heat transfer from stationary component 152.

Figure 7:
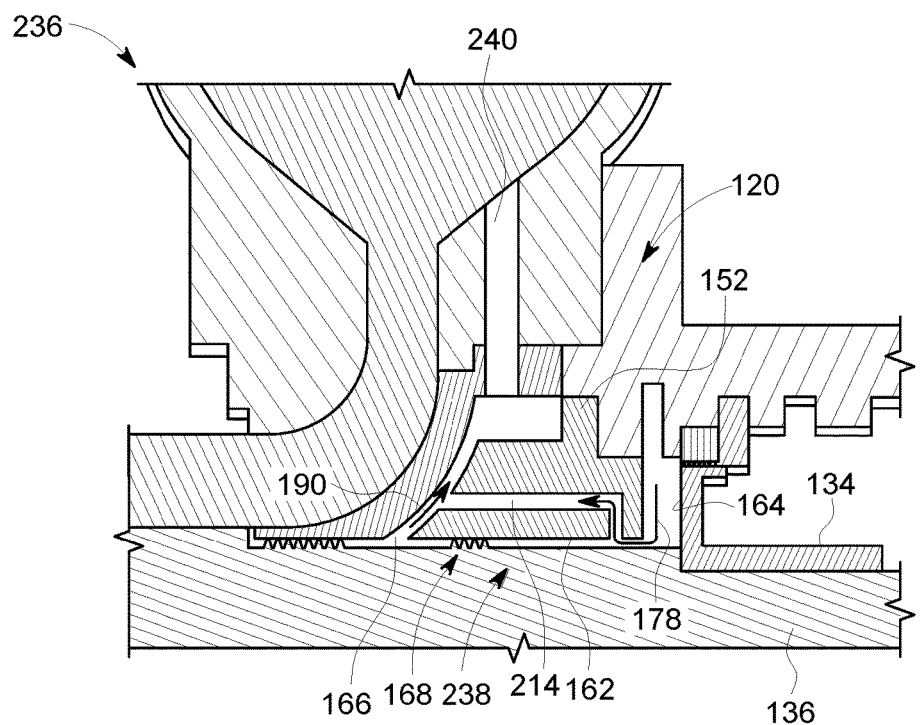
FIG. 7 is partial cross sectional view of an exemplary exhaust zone of the turbine shown in FIG. 2.

FIG. 7 is a partial cross sectional view of an exhaust zone 236 of turbine 120. In the exemplary embodiment, shaft 136 is rotatably supported within housing 134 and stationary component 152 is coupled to housing 134. Channel 162 is defined between shaft 136 and stationary component 152. Heat exchange assembly 238 includes first flow path 164, second flow path 166, and seal assembly 168. Heat exchange assembly 238 further includes a vent 240 coupled in flow communication with second flow path 166. Moreover, cooling channel 214 is defined within stationary component 152 and in flow communication with first flow path 164 and second flow path 166.

First flow path 164 is configured to receive first fluid 178 and direct first fluid 178 from a flow source (not shown) such as, but limited to, a pump exit and or a compressor discharge and into cooling channel 214. Cooling channel 214 is configured to direct first fluid 178 to mix with second fluid 190 flowing in second flow path 166. Seal assembly 168 is configured to direct first fluid 178 within cooling channel 214 and reduce flow of first fluid 178 within channel 162 as previously described. Second flow path 166 is configured to receive second fluid 190 and direct second fluid 190 adjacent stationary component 152. Seal assembly 168 is configured to direct second fluid 190 within second flow path 166 and reduce flow of second fluid 190 within channel 162 as previously described.

Figure 8:
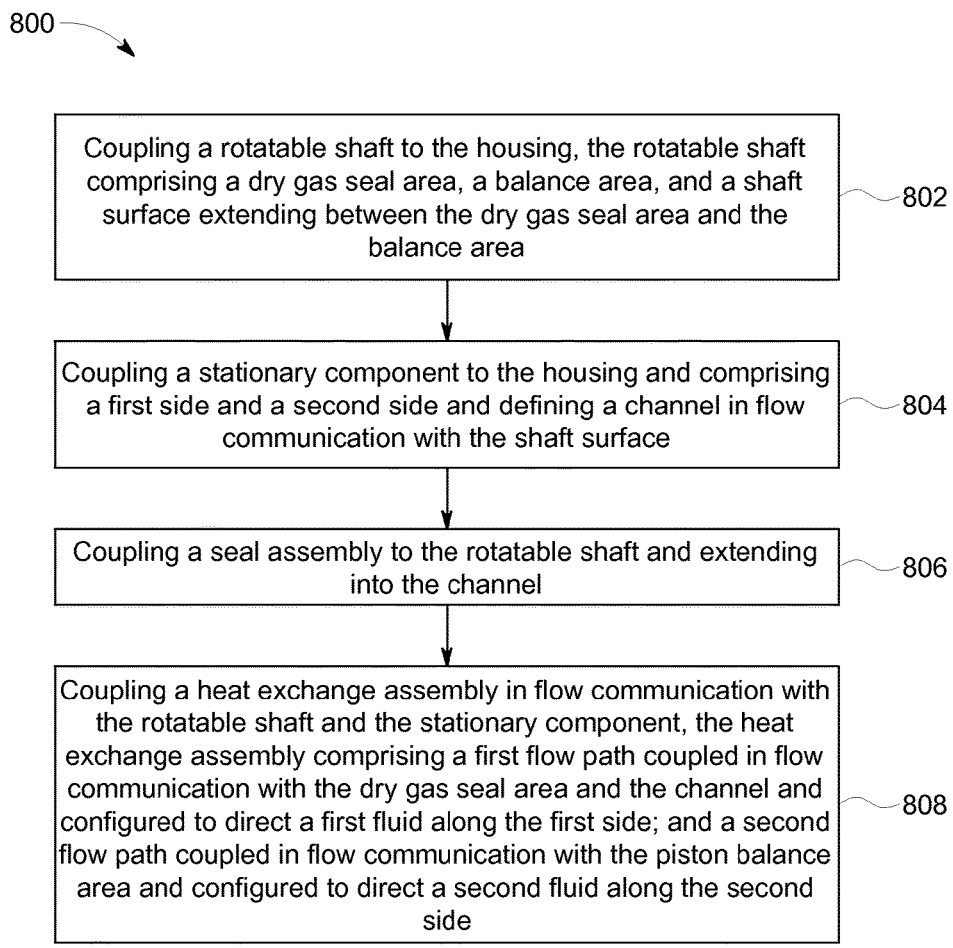
FIG. 8 is a flowchart illustrating an exemplary method of assembling the turbine shown in FIG. 2.

FIG. 8 is a flowchart illustrating an exemplary method 800 of assembling a turbine such as for example turbine 120 (shown in FIG. 2). Method 800 includes coupling 802 rotatable shaft 136 to housing 134 (both shown in FIG. 2). In the exemplary method 800, rotatable shaft 136 includes dry gas seal area 144, balance area 146, and shaft surface 148 extending between dry gas seal area 144 and balance area 146 (all shown in FIG. 3). Method 800 also includes coupling 804 stationary component 152 (shown in FIG. 2) to housing 134 (shown in FIG. 3). Stationary component 152 includes first side 154 and second side 156 and defining channel 162 (all shown in FIG. 3) in flow communication with shaft surface 148 (shown in FIG. 2).

Method 800 further includes coupling 806 seal assembly 168 (shown in FIG. 3) to rotatable shaft 136 (shown in FIG. 3) and extending seal assembly 168 into channel 162 (shown in FIG. 3). Method 800 also includes coupling 808 a heat exchange assembly, such as heat exchange assembly 128 (shown in FIG. 3), in flow communication with rotatable shaft 136 and stationary component 152 (both shown in FIG. 3). In the exemplary method 800, heat exchange assembly 128 includes first flow path 164 (shown in FIG. 3) coupled in flow communication with dry gas seal area 144 and channel 162 (both shown in FIG. 3) and configured to direct first fluid 172 along first side 154 (both shown in FIG. 3). Moreover, in the exemplary method 800, heat exchange assembly 128 includes second flow path 166 (shown in FIG. 3) coupled in flow communication with balance area 146 (shown in FIG. 3) and configured to direct second fluid 190 along second side 156 (both shown in FIG. 3).

The embodiments described herein provide cost-effective and efficient operation of rotational equipment such as, for example only, turbines. More particularly, the exemplary embodiments enable utilizing supercritical fluids such as carbon dioxide as a working fluid in a turbine. Moreover, the embodiments described herein provide for maintaining temperature limits of dry gas seals present within a turbine and mitigating thermal gradients within heated components of a turbine. The embodiments described herein control efficient heat transfer from shafts and stators of a turbine. The embodiments also manage hot process gas to prevent overheating and/or drying of dry gas seals present within a turbine. Still further, the embodiments described herein mitigate stresses within heated components of a turbine while increasing operating efficiency of a turbine. The embodiments provide for decreasing design, installation, operational, maintenance, and/or replacement costs for heated components of a turbine.

The embodiments described herein provide a justification to encourage local anthropogenic carbon dioxide capture from sources such as, but not limited to, power plants, refineries, and the chemical industry for reuse of carbon dioxide as a supercritical working fluid, which can reduce greenhouse emissions as a secondary benefit to the improved turbine operations.

A technical effect of the systems and methods described herein includes at least one of: (a) utilizing supercritical fluids such as carbon dioxide as a working fluid in a turbine; (b) maintaining temperature limits of dry gas seals present within a turbine; (c) mitigating thermal gradients within heated components of a turbine; (d) controlling efficient heat transfer from shafts and stators of a turbine; (e) managing hot process gas to prevent overheating and/or drying of dry gas seals present within a turbine; (f) mitigating stresses within heated components of a turbine; (g) increasing operating efficiency of a turbine; and, (h) decreasing design, installation, operational, maintenance, and/or replacement costs for heated components of a turbine.

Exemplary embodiments of a turbine and methods for assembling a turbine are described herein. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment may be implemented and utilized in connection with many other fluid and/or turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine operable with a first fluid and a second fluid, said turbine comprising:
   a housing;
   a rotatable shaft supported within said housing and comprising a dry gas seal area, a balance area, and a shaft surface extending between said dry gas seal area and said balance area;
   a stationary component coupled to said housing and comprising a first side and a second side and defining a first channel in flow communication with said shaft surface, said stationary component further comprising an end wall defined between said first side and said second side;
   a seal assembly coupled to said shaft surface and extending into said first channel, said seal assembly comprising a first seal and a second seal; and
   a heat exchange assembly coupled to said housing and in flow communication with said rotatable shaft and said stationary component, said heat exchange assembly comprising:
      a first flow path comprising a first inlet, a first outlet coupled in flow communication with said first channel, and a second channel extending between said first inlet and said first outlet,
      wherein said second channel is configured to discharge said first fluid into said first channel,
      wherein said first flow path is coupled in flow communication with said dry gas seal area and said first channel, and
      further wherein said first flow path is configured to direct said first fluid along said first side at a first pressure;
      a first vent coupled in flow communication with said first outlet and said first side, said first seal positioned between said first flow path and said first vent, and said first vent oriented such that the first fluid channeled through said first flow path and then past said first seal is then directed along said first side and past said end wall;
      a second flow path comprising a second inlet, a second outlet coupled in flow communication with said first channel, and a third channel extending between said second inlet and said second outlet,
      wherein said third channel is configured to discharge said second fluid into said second channel,
      wherein said second flow path is coupled in flow communication with said balance area and said first channel, and
      further wherein said second flow path is configured to direct said second fluid along said second side at a second pressure substantially similar to the first pressure; and
      a second vent coupled in flow communication with said second outlet and said second side, said second seal positioned between said second flow path and said second vent, and said second vent oriented such that the second fluid channeled through said second flow path and then past said second seal is then directed along said second side and past said end wall.

2. The turbine of claim 1, wherein said heat exchange assembly comprises an insulator coupled to said stationary component.

3. The turbine of claim 1, wherein said heat exchange assembly comprises a baffle coupled to said housing and in flow communication with said second flow path.

4. The turbine of claim 1, wherein said heat exchange assembly comprises a cooling channel coupled in flow communication with said first flow path and said second flow path.

5. The turbine of claim 1, wherein said first flow path, said second flow path, and said seal assembly are configured to reduce flows of the first fluid and the second fluid within said first channel.

6. The turbine of claim 1, wherein said stationary component comprises a stator.

7. The turbine of claim 1, wherein said first seal is coupled to said shaft surface and said second seal is coupled to said shaft surface.

8. A power generation system comprising:
   a waste heat recovery unit configured to heat a supercritical working fluid having a Biot number of at least one;
   a turbine coupled in flow communication with said waste heat recovery unit, said turbine comprising:
      a housing;
      a rotatable shaft supported within said housing; and
      a stator coupled to the housing and comprising a first side and a second side and defining a first channel in flow communication with said rotatable shaft, said stator further comprising an end wall defined between said first side and said second side;
      a seal assembly coupled to said housing and extending into said first channel, said seal assembly comprising a first seal and a second seal; and a heat exchange assembly coupled to said turbine and in flow communication with said rotatable shaft and said stator, said heat exchange assembly comprising:
a first flow path comprising a first inlet a first outlet coupled in flow communication with said first channel, a second channel extending between said first inlet and said first outlet and configured to discharge said first fluid into said first channel, and a first vent coupled in flow communication with said first outlet and said first side, said first seal positioned between said first flow path and said first vent, and said first vent oriented such that a fluid channeled through said first flow path and then past said first seal is then directed along said first side and past said end wall at a first pressure; and
a second flow path comprising a second inlet, a second outlet coupled in flow communication with said first channel, a third channel extending between said second inlet and said second outlet and configured to discharge said second fluid into said second channel, and a second vent coupled in flow communication with said second outlet and said second side, said second seal positioned between second flow path and said second vent, and said second vent oriented such that the supercritical fluid channeled through said second flow path and then past said second seal is then directed along said second side and past said end wall at a second pressure substantially similar to the first pressure.

9. The power generation system of claim 8, wherein said rotatable shaft comprises a thermal conductivity less than an effective heat transfer coefficient of the supercritical fluid.

10. The power generation system of claim 8, wherein said first vent is coupled in flow communication with said first channel and comprises at least one of a square channel and a round channel.

11. The power generation system of claim 8, wherein said second vent is coupled in flow communication with said first channel and comprises at least one of a square channel and a round channel.

12. The power generation system of claim 8, wherein said seal assembly comprises at least one of a labyrinth seal, a brush seal, and a honeycomb seal coupled to shaft surface and extending into said channel.

13. The power generation system of claim 8, wherein shaft is configured operable with the supercritical fluid comprising carbon dioxide having a Biot number with a range from about 5 to about 50.

14. A method of assembling a turbine within a housing, said method comprising:
coupling a rotatable shaft to the housing, the rotatable shaft comprising a dry gas seal area, a balance area, and a shaft surface extending between the dry gas seal area and the balance area;
coupling a stationary component to the housing and comprising a first side and a second side and defining a first channel in flow communication with the shaft surface, said stationary component further comprising an end wall defined between said first side and said second side;
coupling a seal assembly to the rotatable shaft and extending into the first channel, the seal assembly including a first seal and a second seal; and
coupling a heat exchange assembly in flow communication with the rotatable shaft and the stationary component, the heat exchange assembly comprising:
a first flow path comprising a first inlet, a first outlet coupled in flow communication with said first channel, and a second channel extending between said first inlet and said first outlet,
wherein said second channel is configured to discharge said first fluid into said first channel,
wherein said first flow path is coupled in flow communication with the dry gas seal area and the first channel, and
further wherein said first flow path is configured to direct a first fluid along the first side;
a first vent coupled in flow communication with the first outlet and the first side, the first seal positioned between the first flow path and the first vent, and the first vent oriented such that the first fluid channeled through the first flow path and then through the first seal is then directed along the first side and past said end wall;
a second flow path comprising a second inlet, a second outlet coupled in flow communication with said first channel, and a third channel extending between said second inlet and said second outlet,
wherein said third channel is configured to discharge said second fluid into said second channel,
wherein said second flow path is coupled in flow communication with the balance area and the first channel, and
further wherein said second flow path is configured to direct a second fluid along the second side; and
a second vent coupled in flow communication with the second outlet and the second side, the second seal positioned between the second flow path and the second vent, and the second vent oriented such that the second fluid channeled through the second flow path and then through the second seal is then directed along the second side and past said end wall.

15. The method of claim 14 further comprising coupling an insulator to the stationary component.

16. The method of claim 14 further comprising coupling a baffle to the housing, the baffle positioned in flow communication with the second flow path.

17. The power generation system of claim 8, wherein said heat exchange assembly further comprises a baffle coupled to said housing and in flow communication with said second flow path.

18. The power generation system of claim 8, wherein said heat exchange assembly further comprises an insulator coupled to said stator.

19. The power generation system of claim 8, wherein said heat exchange assembly further comprises a cooling channel coupled in flow communication with said first flow path and said second flow path.

20. The power generation system of claim 19, wherein said cooling channel comprises at least one of a square channel and a round channel.

* * * * *